United States Patent
Dobbins et al.

(10) Patent No.: US 6,249,820 B1
(45) Date of Patent: *Jun. 19, 2001

(54) INTERNET PROTOCOL (IP) WORK GROUP ROUTING

(75) Inventors: Kurt A. Dobbins, Bedford; David L. Cullerot, Manchester; Stephen H. Negus, Winhdam, all of NH (US); William T. Haggerty, Dunstable, MA (US)

(73) Assignee: Cabletron Systems, Inc., Rochester, NH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/073,557

(22) Filed: May 6, 1998

Related U.S. Application Data

(63) Continuation of application No. 08/501,324, filed on Jul. 12, 1995, now Pat. No. 5,751,971.

(51) Int. Cl.[7] .................................................. G06F 15/173
(52) U.S. Cl. ............................................ 709/238; 709/249
(58) Field of Search ................................. 709/238, 239, 709/245, 249, 250; 370/351, 401, 409

(56) References Cited

U.S. PATENT DOCUMENTS

| 5,423,002 | | 6/1995 | Hart ..................................... 395/200 |
|---|---|---|---|
| 5,430,727 | * | 7/1995 | Callon ................................. 370/401 |
| 5,432,907 | | 7/1995 | Picazo, Jr. et al. ................... 395/200 |
| 5,535,338 | | 7/1996 | Krause et al. ..................... 395/200.2 |
| 5,640,456 | * | 6/1997 | Adams, Jr. et al. ................... 380/49 |
| 5,751,971 | * | 5/1998 | Dobbins et al. ..................... 709/238 |
| 5,835,710 | * | 11/1998 | Nagami et al. ..................... 709/250 |

OTHER PUBLICATIONS

Setting Up Address Information http://www.sareen.com/ot98mon/SettingUpAddressInformation.htm, No Date.*
Integrated Routing and Bridging http://www.ccci.com/welcher/papers/irb.htm, No Date.*

(List continued on next page.)

*Primary Examiner*—Mehmet B. Geckil
(74) *Attorney, Agent, or Firm*—Wolf, Greenfield & Sacks, P.C.

(57) ABSTRACT

Apparatus and method wherein multiple router interfaces are assigned the same IP network address, creating an IP work group. This enhances host mobility by allowing, in one embodiment, a host to be relocated anywhere in the work group without requiring reconfiguration of the host. As a further option, host address ranges may be specified (i.e., locked) to designated interfaces of the work group, to enhance security by restricting the allowed host mobility within the work group. An additional advantage is a reduced consumption of network and subnet addresses, because now a single address is used for several physical networks.

35 Claims, 12 Drawing Sheets

OTHER PUBLICATIONS

"Host Groups: A Multicast Extension for Datagram Internetworks", D.R. Cheriton et al., High Light–Weight Fuel Cell Electrodes, Sep. 10, 1985, pp. 172–179, XP000560608.

"Load Balancing for TCP/IP Protocol for VM/MVS", IBM Technical Disclosure Bulletin, vol. 38, No. 09, Sep. 1995, pp. 7–9, XP000540166.

"Switched Multimegabit Data Service and Earyl Availability Via MAN Technology", C.F. Hemrick et al., IEEE Communications Magazine, vol. 26, No. 4, Apr. 1988, pp. 9–14, XP002027186.

"IMHP: A Mobile Host Protocol for the Internet", C. Perkins et al., Computer Networks and ISDN vol. 2, Jan. 1, 1994, pp. 479–491, XP000560108.

"Scalable and Robust Internetwork Routing for Mobile Hosts", D.B. Johnson, Proceedings of the Intern'l Conference on Distributed Computin Systems, Poland, Jun. 21–24, 1994, pp. 2–11, XP000489063.

"LAN Emulation on an ATM Network", Hong Linh Truong et al., IEEE Communications Magazine, vol. 33, Nol. 5, May 1, 1995, pp. 70–85, XP000518773.

"Internetworking with TCP/IP, vol. 1, Principals, Protocols and Architecture," C.D. Comer, Prentice Hall, Englewood Cliffs, New Jersey, 2nd Ed., Chap. 16, pp. 265–280.

Fuller et al., "Classless Inter–Domain Routing (CIDR)," Network Working Group, RFC 1519, 9/93, pp. 1–24.

Y. Rekhter et al., "An Architecture/or IP Address Albcation with CIDR," Network Working Group, RFC 1518, 9/93, pp. 1–27.

J. Moy, "OSPF Version 2," Network Working Group, RFC 1583, 3/94, pp. 1–216.

Richard Stevens, "TCP/IP Illustrated," Addison–Wesley Publishing Co., 1994, pp. 121 and 137–141.

\* cited by examiner

FIG. 3

| ID | HOST ADDRESS | SUBNET MASK | SECURITY | FAST PATH | ROW STATUS | OPER STATUS | NUM ACTIVE INT | NUM TOTAL INT |
|---|---|---|---|---|---|---|---|---|
| 1 | 134.141.40.2 | 255.255.255.0 | LOW | ENABLED | ACTIVE | OK | 1 | 2 |
| 5 | 134.141.41.2 | 0 | MEDIUM | DISABLED | NOTREADY | DISABLED | 0 | 0 |
| 43 | 134.142.43.5 | 255.255.0.0 | HIGH | ENABLED | NOTINSERVICE | DISABLED | 0 | 0 |

FIG. 4

| ID | IFINDEX | NUMACTIVEHOSTS | NUMKNOWNHOSTS | ROWSTATUS | OPERSTATUS |
|---|---|---|---|---|---|
| 1 | 1 | 0 | 4 | NOTINSERVICE | DISABLED |
| 1 | 3 | 0 | 31 | ACTIVE | LINKDOWN |
| 1 | 4 | 1 | 3 | ACTIVE | OK |
| 43 | 6 | 0 | 22 | ACTIVE | WORKGROUPINVALID |
| 43 | 7 | 0 | 110 | ACTIVE | WORKGROUPINVALID |

FIG. 5

| ID | BEGADDRESS | ENDADDRESS | IFINDEX | PHYSADDR | ROWSTATUS | OPERSTATUS |
|---|---|---|---|---|---|---|
| 1 | 134.141.40.0 | 134.141.40.11 | 1 | 0 | ACTIVE | INTERFACEINVALID |
| 1 | 134.141.40.0 | 134.141.40.11 | 3 | 0 | ACTIVE | INTERFACEINVALID |
| 1 | 134.141.40.12 | 134.141.40.12 | 4 | 0:1:2:3:4:5 | ACTIVE | OK |
| 43 | 134.142.43.31 | 134.142.43.31 | 6 | 9:8:7:6:5:4 | ACTIVE | WORKGROUPINVALID |

FIG. 6

| HOST ADDRESS | IFINDEX | ID | PHYSADDR | HOSTSTATUS |
|---|---|---|---|---|
| 134.141.40.12 | 4 | 1 | 0:1:2:3:4:5 | VALID |
| 134.142.43.31 | 7 | 43 | 9:8:7:6:5:4 | INVALID-RANGE |

INTERNET PROTOCOL (IP) WORK GROUP ROUTING

This application is a continuation of application Ser. No. 08/501,324, filed Jul. 12, 1995, entitled INTERNET PROTOCOL (IP) WORK GROUP ROUTING, and now U.S. Pat. No. 5,751,971.

BACKGROUND OF THE INVENTION

The present invention relates generally to communications networks and more particularly to a method and apparatus for IP work group routing which provides host mobility, conserves on the assignment of IP subnet addresses, and adds security along with ease of use to network configuration.

The original IP addressing scheme assigned a unique 32-bit internet address to each physical network and required gateways to keep routing tables proportional to the number of networks in the internet. This scheme is acceptable for an internet with tens of networks and hundreds of hosts, but can not handle today's connected internet with tens of thousands of small networks of personal computers because: (1) immense administrative overhead is required merely to manage network addresses; (2) the routing tables and gateways are extremely large; and (3) the number of IP addresses available for assignment is dwindling. Thus, the problem was how to minimize the number of assigned network addresses without destroying the original addressing scheme. See C. D. Comer, "Internetworking With TCP/IP, Vol. 1, Principals, Protocols and Architecture," Prentice Hall, Englewood Cliffs, N.J., 2nd ed., Chap. 16, pp. 265–280 (1991).

A prior art technique for allowing a single network address to span multiple physical networks, and now a required part of IP addressing, is "subnet addressing" or "subnetting." This is illustrated by example in FIG. 1A (taken from Comer, p. 270), wherein a site uses a single class B network address 128.10.0.0 for two physical networks. Except for gateway G, all gateways in the internet route as if there were a single physical net. Once a packet reaches G, it must be sent across the correct physical network to its destination. In this case, the manager of the local site has chosen to use the third octet of the address to distinguish between the two physical networks. Thus, G examines the third octet of the destination address and routes datagrams with value 1 to the network labeled 128.10.1.0 and those with value 2 to the network labeled 128.10.2.0.

Adding subnets only changes the interpretation of IP addresses slightly, as illustrated in FIG. 1B. Instead of dividing the 32-bit IP address into a network prefix and a host suffix, subnetting divides the address into an internet portion and a local portion, where the internet portion identifies a site, and the local portion identifies a physical network and a host on that physical network.

Another change is that a site using subnet addressing must choose a 32-bit subnet mask for each network. Bits in the subnet mask are set to 1 if the network treats the corresponding bit in the IP address as part of the network address, and 0 if it treats the bit as part of the host identifier. It is recommended that sites use contiguous subnet masks (i.e., setting contiguous bits to 1) and that they use the same mask throughout an entire set of physical networks that share an IP address.

The standard IP routing algorithm is also modified to work with subnet addresses, known as "subnet routing." The standard algorithm bases its decision on a table of routes, each table entry containing a pair of:

(network address, next hop address)

where the network address field specifies the IP address of the destination network, N, and the next hop address field specifies the address of a gateway to which datagrams destined for N should be sent. The standard routing algorithm compares the network portion of a destination address to the network address field of each entry in the routing table until a match is found. Because the next hop address field is constrained to specify a machine that is reachable over a directly connected network, only one table look-up is needed.

The modified algorithm for subnet routing maintains one additional field in each table entry that specifies the subnet mask for use with that entry:

(subnet mask, network address, next hop address)

When choosing routes, the modified algorithm performs a bit-wise Boolean "AND" of the full 32-bit destination IP address and the subnet mask, and then checks to see if the result equals the value in the network address field. If so, it routes the datagram to the address specified in the next hop address field If the IP address of the destination network (extracted from the datagram) matches a directly connected network address, the destination IP address from the datagram is resolved to a physical address, the datagram is encapsulated, and the frame sent out on the destination network to the destination host.

With ever increasing numbers of subnets, it would be desirable if further methods were available to conserve on subnet addresses. One potential method for doing this would be to put a bridge on a single router interface to bridge multiple LAN segments; however, this involves the added cost of a bridge and loses the protection of router "fire walls", which administrators set to filter out packets based on destination addresses. Another potential method would be to increase the granularity of subnets by taking more bits from the host portion of the IP address for the subnet mask; however, this approach is very difficult for the network administrator to maintain as the network configuration evolves. Thus, neither of these potential methods offers a satisfactory solution.

It is an object of the present invention to accomplish one or more of: increased host mobility; further conserve on the assignment of network addresses; simplify the configuration of subnets; and provide an enhanced level of security.

SUMMARY OF THE INVENTION

The present invention is a method and apparatus for routing datagrams from a source node to a destination node in an IP communications network, the network including routers having multiple router interfaces connecting multiple physical networks. The method includes the step of assigning multiple router interfaces to a same IP work group address. This enhances host mobility by allowing, in one embodiment, a host to be relocated anywhere in the work group without requiring reconfiguration of the host. The method further includes the option of specifying (i.e., limiting or locking) host address ranges to designated interfaces of the work group. This step enhances security by restricting the allowed host mobility within the work group. The method further includes the optional step of filtering (i.e., dropping) the datagram if at least one of the source and destination hosts does not reside on the designated interface of the IP work group.

In the prior art, each router interface would have a unique IP address; in the present invention, multiple interfaces are assigned the same IP address. The hosts and physical networks connected to the designated multiple interfaces are referred to as a "work group". There are several advantages to this arrangement.

First, there is the advantage of host mobility within the work group. A designated host may be valid if physically located on any one of the several interfaces in the work group.

Another advantage is a reduced consumption of network and subnet addresses, because now a single address is used for several physical networks. As a result, the administrative burden of servicing-physical networks with several addresses is reduced.

Another advantage is that it enables a network administrator to configure a network such that host addresses are allocated in blocks mirroring the physical structure of the network. For example, the administrator might allocate a contiguous block of addresses to each physical network. By providing a block or range of addresses, room is provided for future growth. In addition, one can secure the operational behavior of the network along the same lines as the configuration.

Security is optionally enhanced by only allowing transmission of datagrams to or from hosts with certain addresses. By locking IP (network layer) and MAC (physical layer) addresses, no one (other than the network administrator) can reconfigure an IP address to another MAC address. As a result, unauthorized computers which connect to a network will not be able to transmit datagrams into or out of the work group.

For example, in one embodiment a level of security is assigned to each IP work group by identifying the hosts within the group as "free", i.e., permitting forwarding to/from any interface, or "secured", i.e., permitting forwarding to/from only if the host resides on a designated interface. Hosts may be secured by range or singly; in the latter case the host's physical address may also be secured.

Another feature of this invention which speeds the forwarding procedure is referred to as "FastPath". If a datagram's source and destination addresses are both within the same work group, then header and address validation may be skipped.

These and other benefits and features of the present invention will be more particularly described with respect to the following detailed description and drawings.

BRIEF DESCRIPTION OF THE DRAWINGS

FIG. 3 illustrates a Definition table according to one embodiment of the invention.

FIG. 4 illustrates an Interface table according to one embodiment of the invention.

FIG. 5 illustrates a Range table according to one embodiment of the invention.

FIG. 6 illustrates a Host table according to one embodiment of the invention.

DETAILED DESCRIPTION

Figure 1A:
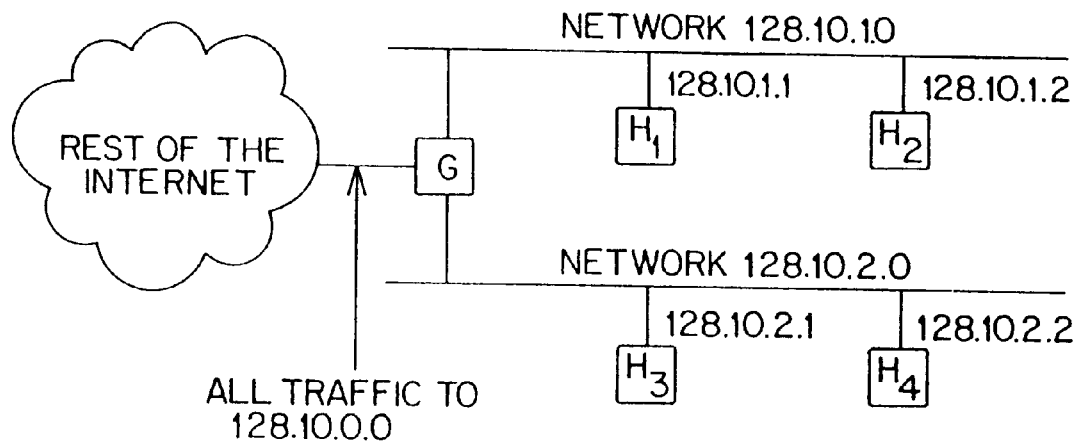
FIG. 1A is a schematic illustration of a gateway G connecting two physical networks to the rest of the internet, and illustrating the prior art IP subnet addressing scheme.
Figure 1B:
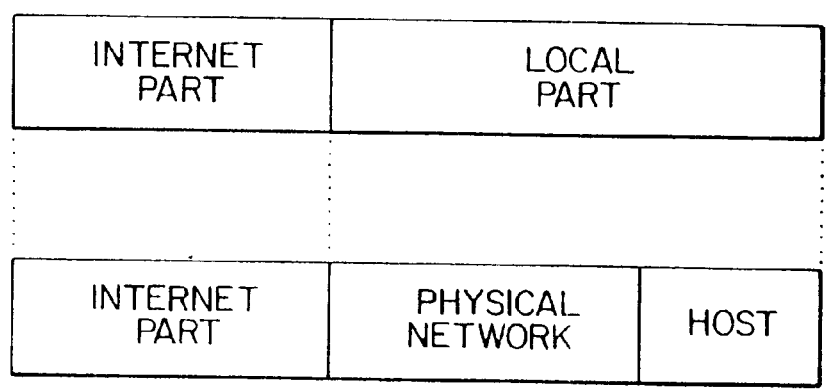
FIG. 1B illustrates, in the top portion, the original IP addressing scheme in which a 32-bit class B IP address is considered to have a 2-octet internet portion and a 2-octet local portion; in the bottom portion, a modified IP subnet addressing scheme is illustrated in which a 2-octet internet part identifies a site, and a 2-octet local part is divided into two parts, one part identifying a physical network (subnet) and a second part identifying a host on that subnet.

The following definitions are useful in understanding the present invention (taken from D. Comer, pp. 477–511):

ARP: (Address Resolution Protocol) The TCP/IP protocol used to dynamically bind a high level IP address to a low-level physical hardware address. ARP is only across a single physical network and is limited to networks that support hardware broadcast.

directed broadcast address: An IP address that specifies "all hosts" on a specific network. A single copy of a directed broadcast is routed to the specified network where it is broadcast to all machines on that network.

gateway: A special purpose, dedicated computer that attaches to two or more networks and routes packets from one to the other. In particular, an IP gateway routes IP datagrams among the networks to which it connects. Gateways route packets to other gateways until they can be delivered to the final destination directly on one physical network. The term is loosely applied to any machine that transfers information from one network to another, as in mail gateway. Although the original literature used the term gateway, vendors often call them IP routers.

Host: Any (end-user) computer system that connects to a network. Hosts range in size from personal computers to supercomputers. Also see gateway.

ICMP: (Internet Control Message Protocol) An integral part of the Internet Protocol that handles error and control messages. Specifically, gateways and hosts use ICMP to send reports of problems about datagrams back to the original source that sent the datagram. ICMP also includes an echo request/reply used to test whether a destination is reachable and responding.

internet: Physically, a collection of packet switching networks interconnected by gateways along with protocols that allow them to function logically as a single, large, virtual network. When written in upper case, Internet refers specifically to the connected Internet and the TCP/IP protocols it uses.

Internet: The collection of networks and gateways, including the MILNET and NSFNET, that use the TCP/IP protocol suite and function as a single, cooperative virtual network. The Internet provides universal connectivity and three levels of network services; unreliable, connectionless packet delivery; reliable, full duplex stream delivery; and application level services like electronic mail that build on the first two. The Internet reaches many universities, government research labs, and military installations and over a dozen countries.

IP: (Internet Protocol) The TCP/IP standard protocol that defines the IP datagram as the unit of information passed across an internet and provides the basis for connectionless, best-effort packet delivery service. IP includes the ICMP control and error message protocol as an integral part. The entire protocol suite is often referred to as TCP/IP because TCP and IP are the two most fundamental protocols.

IP address: The 32-bit address assigned to hosts that want to participate in a TCP/IP internet. IP addresses are the abstraction of physical networks. Actually assigned to the interconnection of a host to a physical network, an IP address consists of a network portion and a host portion. The partition makes routing efficient.

IP datagram: The basic unit of information passed across a TCP/IP internet. An IP datagram is to an internet as a hardware packet is to a physical network. It contains a source and destination address along with data.

MIB: (Management Information Base) The set of variables (database) that a gateway running CMOT or SNMP maintains. Managers can fetch or store into these variables. MIB-II refers to an industry-standard extended management database that contains variables common to the configuration of network devices.

packet: The unit of data sent across a packet switching network. The term is used loosely. While some TCP/IP literature uses it to refer specifically to data sent across a physical network, other literature views an entire TCP/IP internet as a packet switching network and describes IP datagrams as packets.

proxy ARP: The technique in which one machine, usually a gateway, answers ARP requests intended for another by supplying its own physical address. By pretending to be another machine, the gateway accepts responsibility for routing packets to it.

route: In general, a route is the path that network traffic takes from its source to its destination. In a TCP/IP internet, each IP datagram is routed separately; the route a datagram follows may include many gateways and many physical networks.

router: Generally, any machine responsible for making decisions about which of several paths network traffic will follow based on a network level address. When used with TCP/IP, the term refers specifically to an IP gateway that routes datagrams using IP destination addresses. In a TCP/IP internet, each IP gateway is a router because it uses IP destination addresses to choose routes.

SNMP: (Simple Network Monitoring Protocol) A standard protocol used to monitor IP gateways and the networks to which they attach. SNMP defines a set of variables that the gateway must keep and specifies that all operations on the gateway are a side-effect of fetching or storing to the data variables. Also see MIB.

subnet address: An extension of the IP addressing scheme that allows a site to use a single IP network address for multiple physical networks. Outside of the site using subnet addressing, routing continues as usual by dividing the destination address into a network portion and local portion. Gateways and hosts inside a site use subnet addressing to interpret the local portion of the address by dividing it into a physical network portion and host portion.

Figure 2:
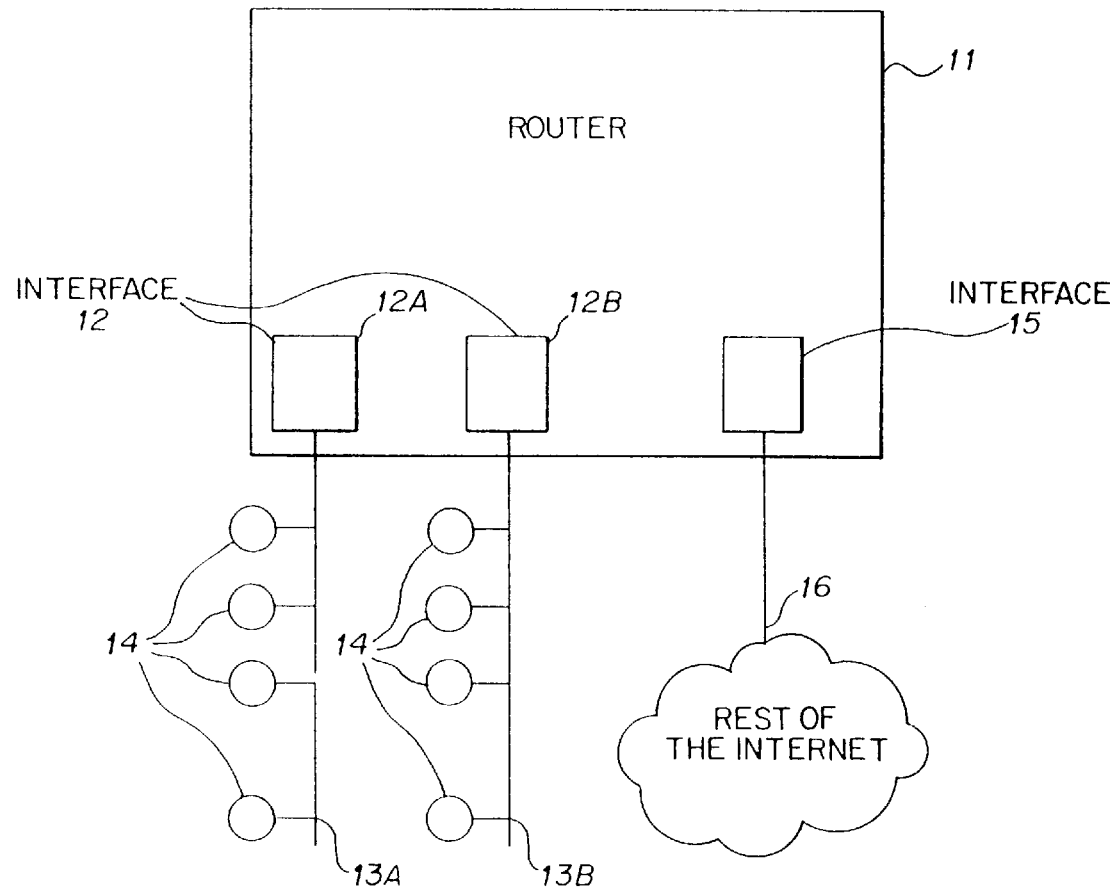
FIG. 2 is a schematic illustration of a router, with multiple interfaces connected to different physical networks and another interface connected to the rest of the internet.

FIG. 2 illustrates a multi-interface router 11 for connecting several physical networks to an IP internet. The router 11 includes multiple interfaces 12A, 12B, each of which connects to a physical network 13A, 13B including one or more hosts 14. The router further includes an interface 15 which connects to the rest of the internet 16.

In the prior art, each of the interfaces 12 would have a unique IP address; in the present invention, both interfaces 12 are assigned the same IP address. The hosts 14 and networks 13 connected to both interfaces 12 are referred to as a "work group".

Work Group Tables

An IP work group contains the managed objects used to set up and configure the IP router interfaces (ports) into associations known as work groups. Each work group is a subnet with one address and security level shared by the associated interfaces.

In a specific embodiment described herein, the configuration of IP work groups is done through four tables: Definition, Interface, Range, and Host. The first three are configuration tables and the fourth is a read-only status table. Each configuration table's key begins with "ID", the work group identifier. These tables are implemented as AVL binary trees; a tree does not have a predefined size and may grow freely. Prior art management routines are used to allow network management to set entries and retrieve them from the tables in serial order in support of the Simple Network Management Protocol (SNMP).

The four tables provide the following functions, described in more detail below:

Definition table 30 (FIG. 3): each entry defines a work group and assigns each work group a Host Address 32 and Subnet Mask 33 and a Security level.

Interface table 40 (FIG. 4): each entry associates an interface (defined by IfIndex 42) to a work group.

Range table 50 (FIG. 5): each entry locks a range of host addresses (BegAddress 52 to EndAddress 53) to an interface of a work group.

Host table 60 (FIG. 6): each entry lists the active (i.e., discovered) hosts (Host Address 61) along with their associated interface and physical address.

Referring to FIG. 3, the Definition table 30 includes an ID field 31 which identifies by an integer a separate work group in each row. For a given row, the work group is assigned a Host Address (field 32) and a Subnet Mask (field 33) which together (logical AND) define the subnet (IP subnet address) for a given work group, e.g., for work group "1", the subnet is 134.141.40.0.

The Security field 34 sets the level of security for the work group. Security means the filtering of packet forwarding through the Range table 50 (FIG. 5). Hosts may be secured by range or singly. Four levels of security are provided:

| none | all hosts are tree and the range table is not consulted in packet forwarding; |
|---|---|
| low | host may be free or secured in the range table; |
| medium | host must be secured, by range or singly; |
| high | host must be secured singly, with physical address also configured. |

The FastPath field 35 designates whether this service is enabled or disabled. If enabled, it speeds up the forwarding of packets within a work group (i.e., both source and destination in the same work group) by skipping IP header and address validation. If disabled, IP header and address validation are performed.

The RowStatus field 36 is defined in the context of the SNMPv2 textual convention. The three readable states are:

| active | work group entry is active and usable by the router; |
|---|---|
| notinservice | entry is fully defined but administratively inactive; |

-continued

| SNMPv2 textual convention. The three readable states are: | |
| --- | --- |
| notready | entry is not yet fully defined (e.g., workgroup "5" still requires a mask). |

A work group not in the Definition table, or in the Definition table but with a RowStatus marked "notready," cannot be used as a key in creating entries in the Interface and Range tables.

RowStatus is a status object used to administrate conceptual rows in the work group tables defined above (FIGS. 3–6). It is an integer used here in an SNMPv1 MIB, but intended to have the same semantics as the RowStatus textual convention for SNMPv2.

RowStatus is used to manage the creation and deletion of conceptual rows, and has six defined values:

| active | usable by the managed device; |
| --- | --- |
| notInService | unusable, row information complete; |
| notReady | unusable, row information incomplete; |
| createAndGo | set to create a row in active status; |
| createAndWait | set to create a row in either notReady or notInService status; |
| destroy | set to delete existing row. |

The first three values are states which may be retrieved by a management protocol get operation. The last three values are actions—they may be written, but not read. All values except "notReady" may be specified in a set operation. For example, to temporarily disable a row, set status to "notInService" and reactivate it later by a set to "active". The agent alone determines "notReady" status. If a row was created by a set of "createAndWait" and the agent has enough row information from instance and default values to complete the row, this status will be set to "notInService", or else to "notReady".

The OperStatus field 37 defines the operational status of a work group definition entry. The four states are:

| ok | operational work group; |
| --- | --- |
| disabled | row status is not active; |
| subnetConflict | conflict with IP address of another interface (existing active entry in this work group definition table); |
| internalError | system problem, e.g., out of memory. |

The NumActiveInt field 38 records the number of interfaces (ports) in this work group which have an operational status of "OK" in the interface table (FIG. 4).

The NumTotalInt field 39 records the number of interfaces in this work group.

FIG. 4 shows the Interface table 40. An interface must be configured in the Interface table before it can be entered into the work group. An interface entry is keyed by ID and IfIndex.

The ID field 41 identifies the work group, e.g., FIG. 4 shows 2 workgroups: "1" and "43".

The IfIndex field 42 identifies the router interface by number; these numbers are defined in accordance with the MIB-II interfaces group.

The NumActiveHosts field 43 (read only), identifies the number of hosts recently active on the interface, e.g., averaging over the cache age out interval.

The NumKnownHosts field 44 identifies the number of hosts seen on the interface since the last reboot.

The RowStatus field 45 is defined in accordance with the SNMPv2 textual convention defined above.

The OperStatus field 46 defines the operational status of this interface (port) entry. The seven states are:

| ok | entry is operational |
| --- | --- |
| disabled | this entry's row status is not active; |
| workgroupInvalid | either there is no work group defined for this entry or the operational status of the work group in the definition table is not OK; |
| addressConflict | there is a conflict of the work group address with an address configured in the IP address table; |
| resetRequired | no conflict, this entry's row status has just been activated, and a reset of the router is required to be operationally OK; |
| linkDown | no physical connections on this interface; |
| routingDown | routing or forwarding has been administratively disabled |
| internalError | unspecified internal problems. |

FIG. 5 illustrates the Range table. The Range table 50 configures host IP address ranges, assigning them to an existing interface for a designated work group. A range entry is keyed by ID 51, BegAddress 52, EndAddress 53 and IfIndex 54.

Entries in the same work group (ID) may not have overlapping host address ranges, but may have duplicate ranges if for different interfaces (e.g., see the first two entries in table 50 with same address range). BegAddress and EndAddress define the beginning and end of the address range, respectively. BegAddress and EndAddress may be the same, so that a range comprises a single host. Single host entries allow for a physical address to be configured in the PhysAddr field 55. In a "high" security work group, such as work group "43", all entries must be single hosts and must have the physical address configured as well to be valid.

More specifically, the address range must lie within the subnet defined for a given work group and thus the entry acquires the security level of that work group. If security is violated, packets to and from a given host IP address will be filtered out by the router. The source and destination IP packet addresses are checked against ranges in the Range table during packet forwarding and must match as follows:

For a high security workgroup, a host must match a single host range entry—it must reside on the port with the physical address as configured in that entry.

For a medium security workgroup, a host must match a range entry in that it resides on that port, but unless a physical address is also specified in that entry, the physical address is not constrained.

For a low security workgroup, a host is free to reside on any port with any physical address as long as its IP address does not lie within the range of any entry in the range table, but if it does fall in a range then it must completely match that entry, or another entry with the duplicate range. Match completely means match the port and, if a physical address is specified, match that as well.

The RowStatus field 56 is defined the same as in the Interface table.

The operstatus field 57 defines the operational status of this range table entry. The following states apply:

| | |
|---|---|
| ok | entry is operational |
| disabled | this entry's row status is not active; |
| workgroupInvalid | no work group or the operational status for the work group in the Definition table is not OK; |
| interfaceInvalid | interface is not in the Interface table or operational status of interface entry is not OK; |
| physAddrRequired | security level of associated work group is high and no physical address has been specified; |
| internalError | system problem |

FIG. 6 illustrates the Host table. The Host table 60 is read only, and is similar to the MIBII Net-to-Media Table, except there are no static entries.

The entries in the Host table are not configured; rather, they are learned and show only hosts active on the network. Each entry is keyed by HostAddress 61 and IfIndex 62, which may be helpful if the network is misconfigured. For example, if two hosts on different interfaces are assigned the same IP address, both entries would show and the problem could then be corrected.

The HostAddress field 61 identifies the IP address of the host. The IfIndex field 62 defines the interface number. The ID field 63 identifies the work group by integer. The PhysAddr field 64 identifies the physical MAC address of the host.

The HostStatus field 65 may have one of the following states:

| | |
|---|---|
| or valid | the entry is valid for forwarding; the host may be unknown if ARP has not discovered on which interface it resides; |
| invalid-multiple | the same host IP address was later found duplicated on another interface; |
| invalid-physAddr | the host matched an entry in the Range table with respect to range and interface, but did not match that entry for physical address; if the work group is high security, this status would result if no physical address was given in the range entry; |
| invalid-range | in a high or medium security work group, the host was not in the range of any entry in the Range table, or it was not in the range of an entry with a matching interface; |
| invalid-interface | the interface was physically down or not in service in the Interface table; |
| invalid-workgroup | the work group does not exist or is not in service in the Definition table; |
| invalid-expired | the host became inactive and aged out on the interface on which it was learned. |

Forwarding Mechanism

Figure 7:
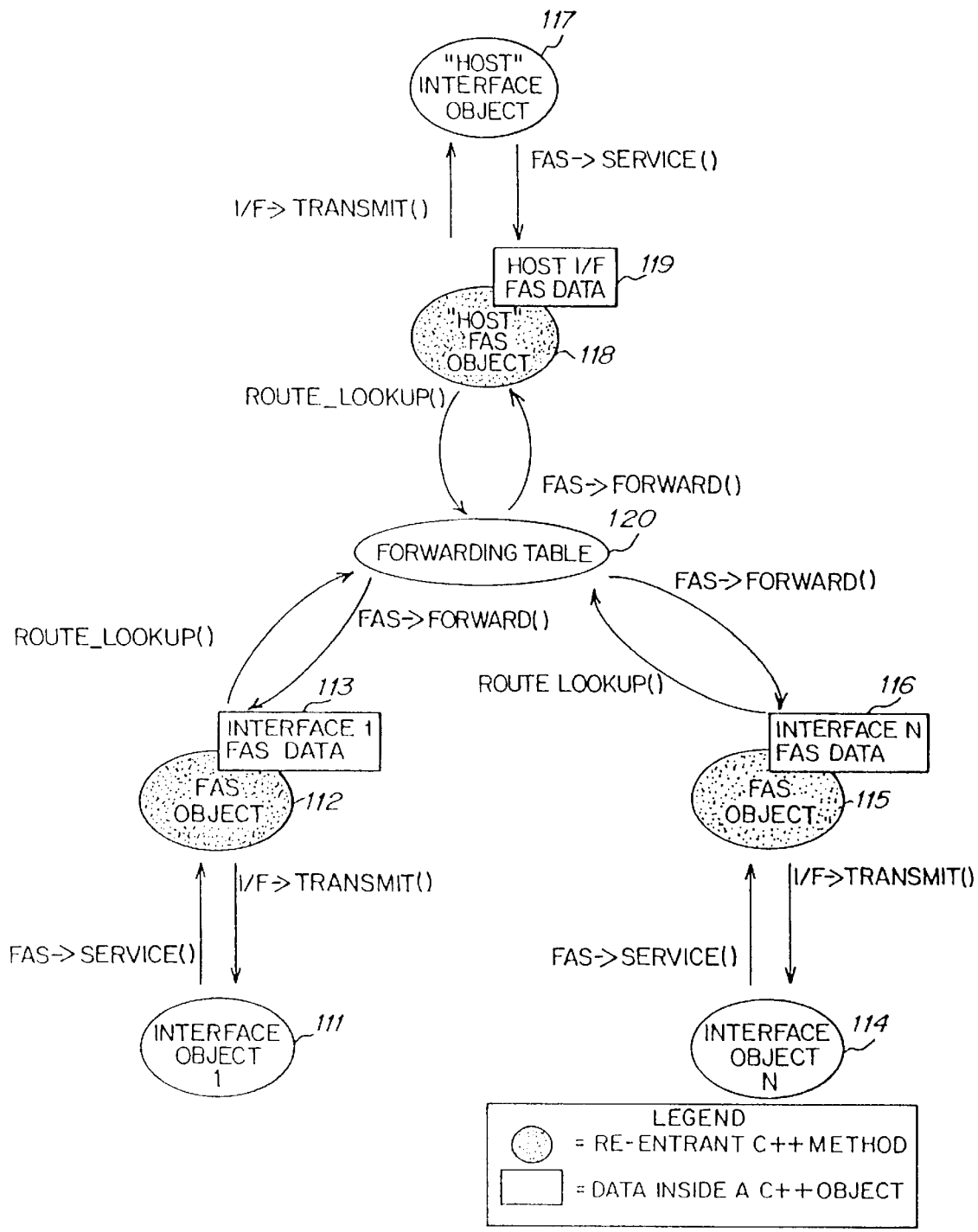
FIG. 7 illustrates service and forwarding methods of distributed autonomous forwarding engines.

FIG. 7 illustrates a distributed router architecture for forwarding unicast IP packets across router interfaces. It places an IP FAS (forwarding service) agent, on each interface, rather than having a single centralized forwarding agent. The distributed FAS agent architecture utilized in the present embodiment is more fully described in copending and commonly owned U.S. Pat. No. 08/216,541 entitled "Distributed Autonomous Object Architecture For Network Layer Routing," filed Mar. 22, 1994 by Kurt Dobbins et al., which is hereby incorporated by reference in its entirety. The distributed object architecture of that application, which is implemented in an object-oriented programming language such as C++, defines all of the router's functional aspects in a common protocol-independent framework which is inherited by every protocol-specific object upon instantiation. In object-oriented programming, the data and methods are united into objects, each of which represents an instance of some class, and which classes are members of a hierarchy of classes united via inheritance relationships.

As illustrated in FIG. 7, each router interface 111, 114, 117 has a forwarding engine 112, 115, 118 sitting on it, and each forwarding engine knows how to receive and transmit packets on its own interface. Each forwarding engine accesses a common forwarding table (FIB) 120. The host interface 117 is treated as an internal interface with a destination address for "local" delivery into the host CPU.

Each forwarding engine has its own data portion 113, 116, 119 that is specific to itself, e.g., interface and media information, address resolution tables, configuration information, etc. However, the method portion 112, 115 and 118 of each engine is common and is shared by all similar engines. The specific goal of each forwarding engine is to provide for the reception, processing and forwarding of network layer packets. At a very high level, all forwarding engines perform the same basic tasks regardless of protocol or media.

The operation of the forwarding engine will now be described with regard to FIG. 7. When an IP packet arrives, physically addressed to router interface-1, it is delivered to that FAS's service routine. The service routine validates the IP header and IP addresses, filters against any access list, and then looks up the destination address in the forwarding information base (FIB) to find a route. A route gives: (a) the outgoing interface; (b) the outgoing FAS, and if the destination is not directly connected to that interface; (c) the next hop router. If there is a valid route the service routine passes the packet to the forward routine of the outgoing FAS.

The forward routine of the outgoing FAS filters against its access list if any, and then tries to resolve the destination IP address or next hop to a physical address suitable for framing by looking in the ARP (address resolution protocol) cache associated with that interface. If the address is resolved the packet is transmitted to that physical address. Otherwise, the packet is deferred on an ARP entry queue and ARP tries to resolve the address through protocol request. If resolved, the deferred packet is dequeued and transmitted by the FAS.

A cache of packet forwarding history is kept by each FAS, keyed by destination and source IP addresses. Address validation, access control filtering and look-up of next hop check the cache first, and if an entry is found there, the method is quick. If at any stage an error occurs in forwarding, the packet is dropped and an ICMP control message is sent back to the source.

Work group routing in accordance with the present invention extends the previously defined forwarding procedure for unicast packet forwarding and for limited broadcast packet forwarding. The existing procedure is sufficient for subnet broadcast and multicast packets.

First of all, proxy ARP is activated for all work group interfaces. Snooping, if activated in the enterprise MIB, is a function by which the interface will monitor ARP communication on its physical network, in order to determine IP addresses and physical addresses of hosts. With snooping active, the router is able to load the work group active Host table (FIG. 6) more quickly.

If a packet's source and destination addresses are both within a single work group, and if FastPath is selected in the Definition table for that work group, then header and address validation may be skipped. This speeds up packet forwarding.

FIB lookup is extended when a work group is implemented. All interfaces of a work group are represented in the FIB by a single route. If this is the route chosen when a packet is looked up in the FIB, the packet is delivered to a special work group FAS which consults the Host table. If a valid entry exists for that destination in the Host table, the packet is passed to the interface FAS given by that entry.

There is a work group FAS created for each work group, which performs relay functions. If a packet arrives at the work group FAS for a host address unknown to the Host table, it creates a temporary, hidden entry in the Host table. The packet is deferred on a queue held with that Host table entry. ARP requests are flooded out to each work group interface in the Interface table, in order to locate the physical address of the destination host.

If ARP requests are resolved, a visible entry with the resolved interface number and physical address is put in the Host table, the hidden entry is removed, and the deferred packet is dequeued and passed to the forward routine of the respective interface FAS to be transmitted. Future packets with the same source and destination IP addresses are handled by the FAS forwarding history caches on the normal forwarding path.

A more detailed flow chart of the forwarding method is illustrated in FIGS. 8a–8g and will now be described.

Figure 8A:
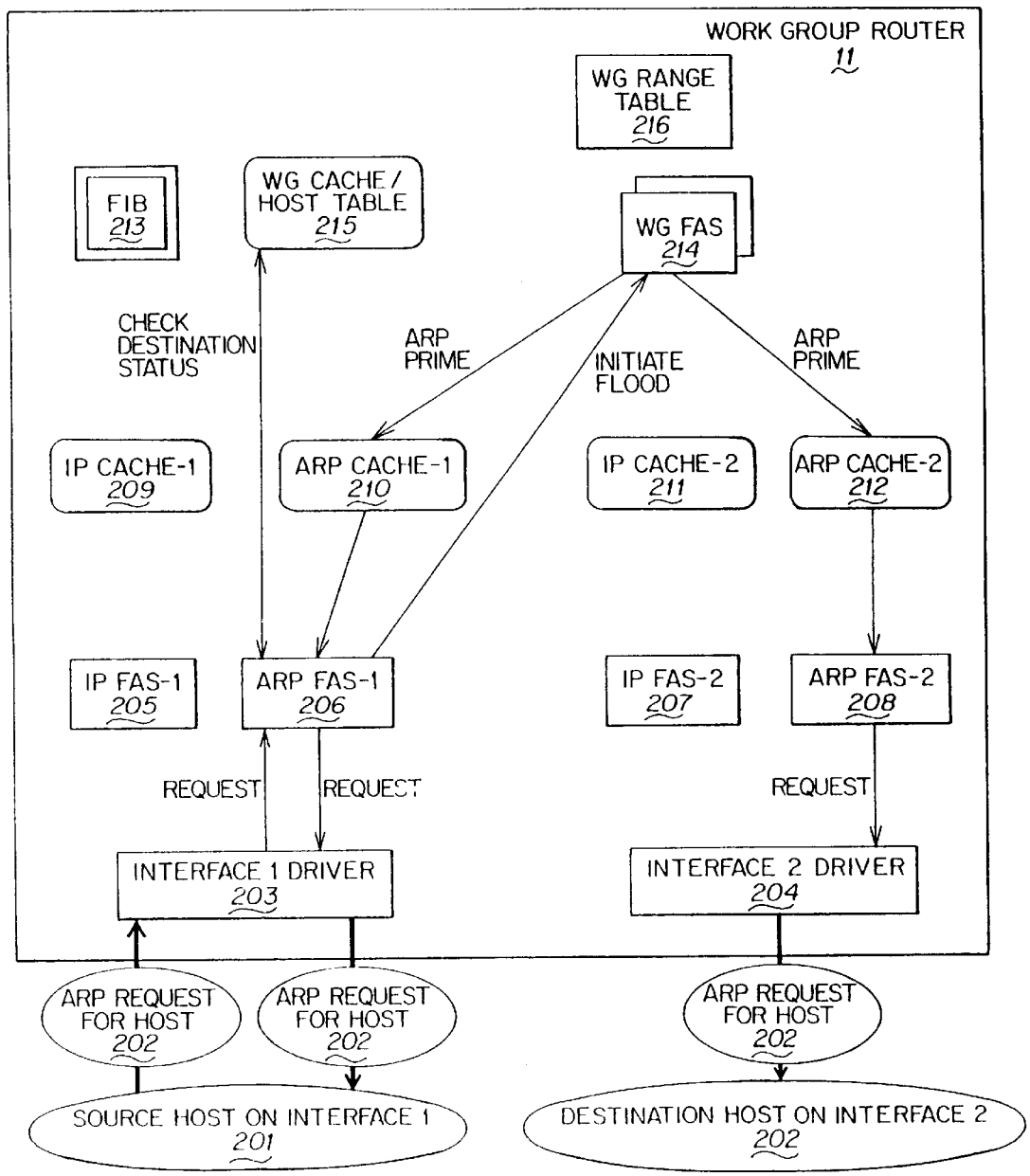
FIGS. 8a–8g are a series of flow diagrams illustrating the forwarding of data packets in accordance with one embodiment of the invention.

Reference FIG. 8a:

Interface-1 and interface-2 are both configured as belonging to a valid work group in the Definition table 30 and are operationally active in the Interface table 40. The WG Cache 215 is part of the Host Table 60.

Source host 201 on interface-1 wants to send an IP packet to destination host 202 on interface-2. Both hosts belong to the same work group subnet, but the IP packet cannot be sent directly because host 201 does not know the physical address of host 202. Host 201 therefore initiates an ARP Request attempting to resolve the IP address of host 202 to a physical address. This request is not received by host 202 because it is on a different physical network link. It is received by router 11 however, because ARP Requests are broadcast on a link.

ARP-FAS-1 206 receives the ARP request on interface-1 and checks with WG cache 215 to determine the status of the destination. Since the destination host 202 is unknown, WG FAS 214 is called to initiate a flood of ARP requests out all interfaces in this work group; thus, ARP Cache-1 210 and ARP Cache-2 212 receive an ARP prime message from WG FAS 214, as shown in FIG. 8A.

Figure 8B:
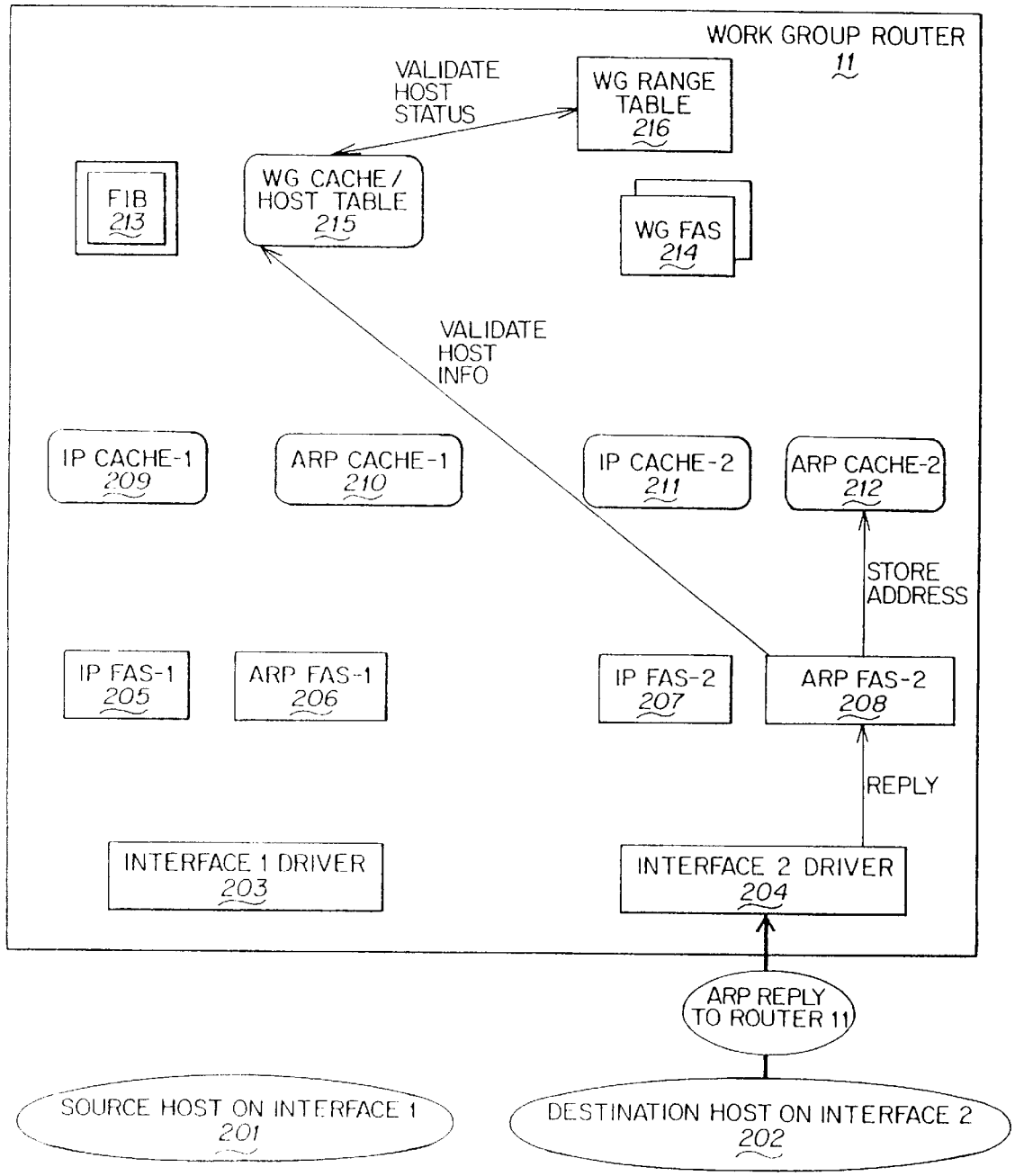

Reference FIG. 8b:

The destination host 202, receiving an ARP Request for its physical address, responds with an ARP Reply to the request source, i.e. the router 11. The router receives the Reply via interface-2 driver 204 forwards it to ARP-FAS-2 208, stores the physical address in the ARP Cache 212, and passes the interface number and physical address to WG Cache 215. The WG Cache validates the information against user-configured entries in the Range table 216 and sets the status (valid or invalid) for the destination host accordingly. This status in the WG Cache entry is visible through the Host table.

Figure 8C:
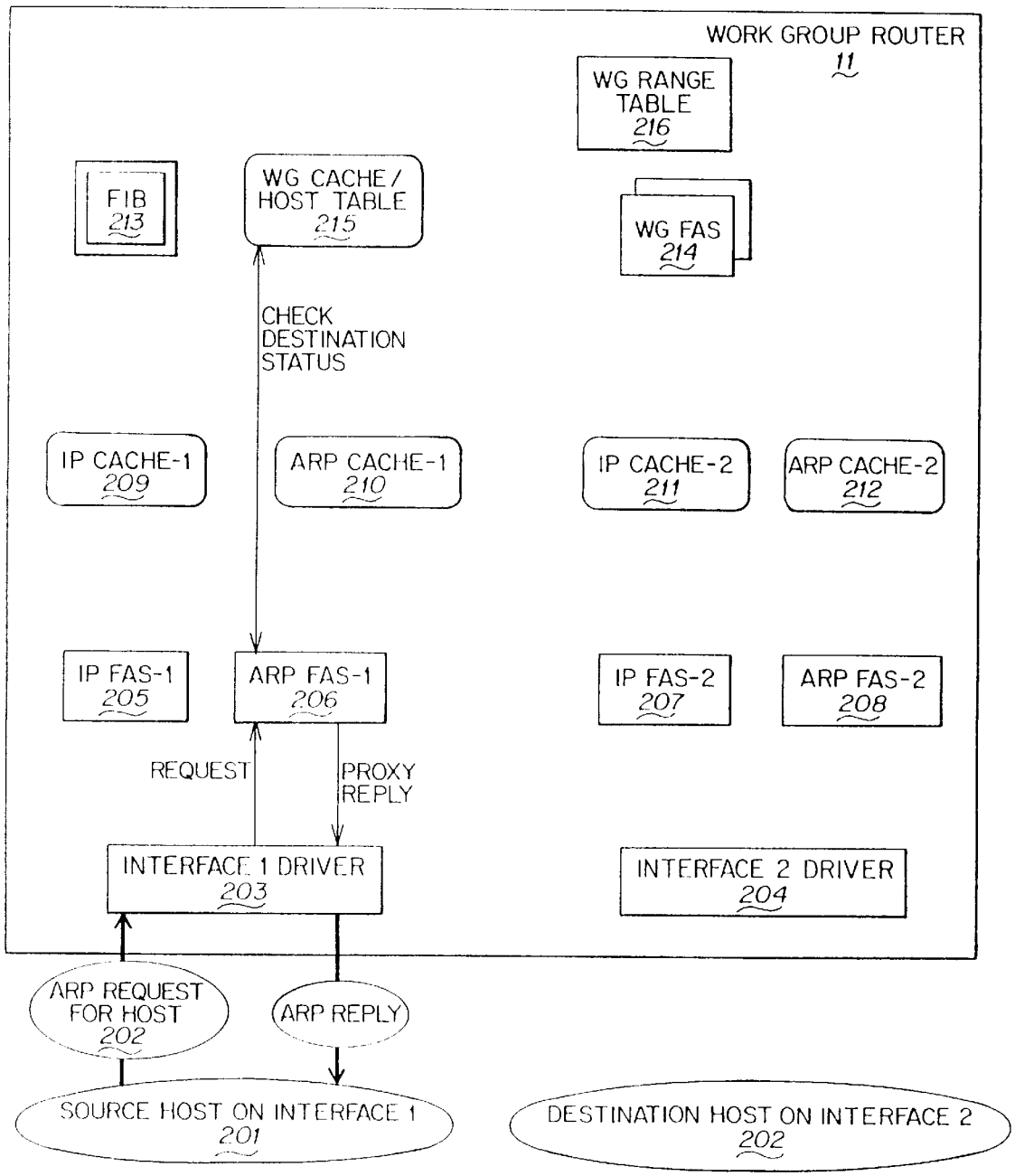

Reference FIG. 8c:

Since ARP requests are tried multiple times according to the standard implementation of the ARP protocol, the source host 201 sends a second ARP Request for destination 202. This time, when ARP FAS-1 206 checks with the WG Cache 215 for the destination host, it finds the host is valid on interface-2. ARP-FAS-1 then does a proxy ARP Reply to source host 201 pretending to be destination host 202.

Figure 8D:
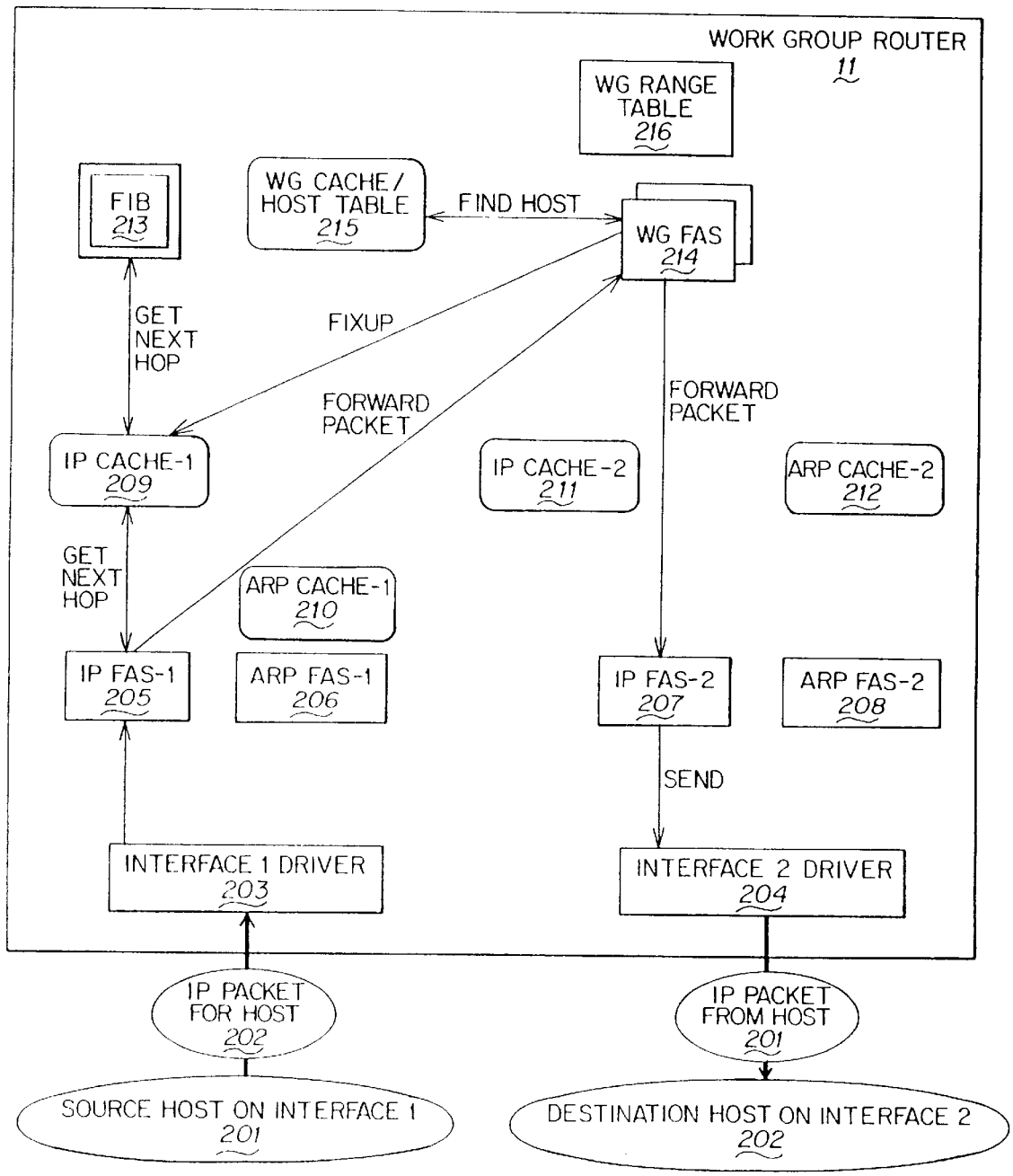

Reference FIG. 8d:

Host 201 having received the ARP Reply, sends the IP packet to the physical address of the router. Interface-1 driver 203 gives the packet to IP FAS-1 205 which attempts to forward the packet. First it checks IP Cache-1 209 for a next hop FAS, but the destination is unknown in this cache so this cache checks with the FIB 213. The FIB holds a route to the WG FAS for the work group subnet, so this information is returned through the cache to IP FAS-1 which forwards the packet to the WG FAS 214.

WG FAS 214 consults the WG Cache 215, finds that the destination host 202 is valid on interface-2 and passes the packet over to IP FAS-2 207. It also updates the IP Cache-1 209 with the information so that future IP packets from host 201 to host 202 can go directly to IP FAS-2. IP FAS-2 207 finally sends the packet out through interface-2 driver 204 to host 202.

Figure 8E:
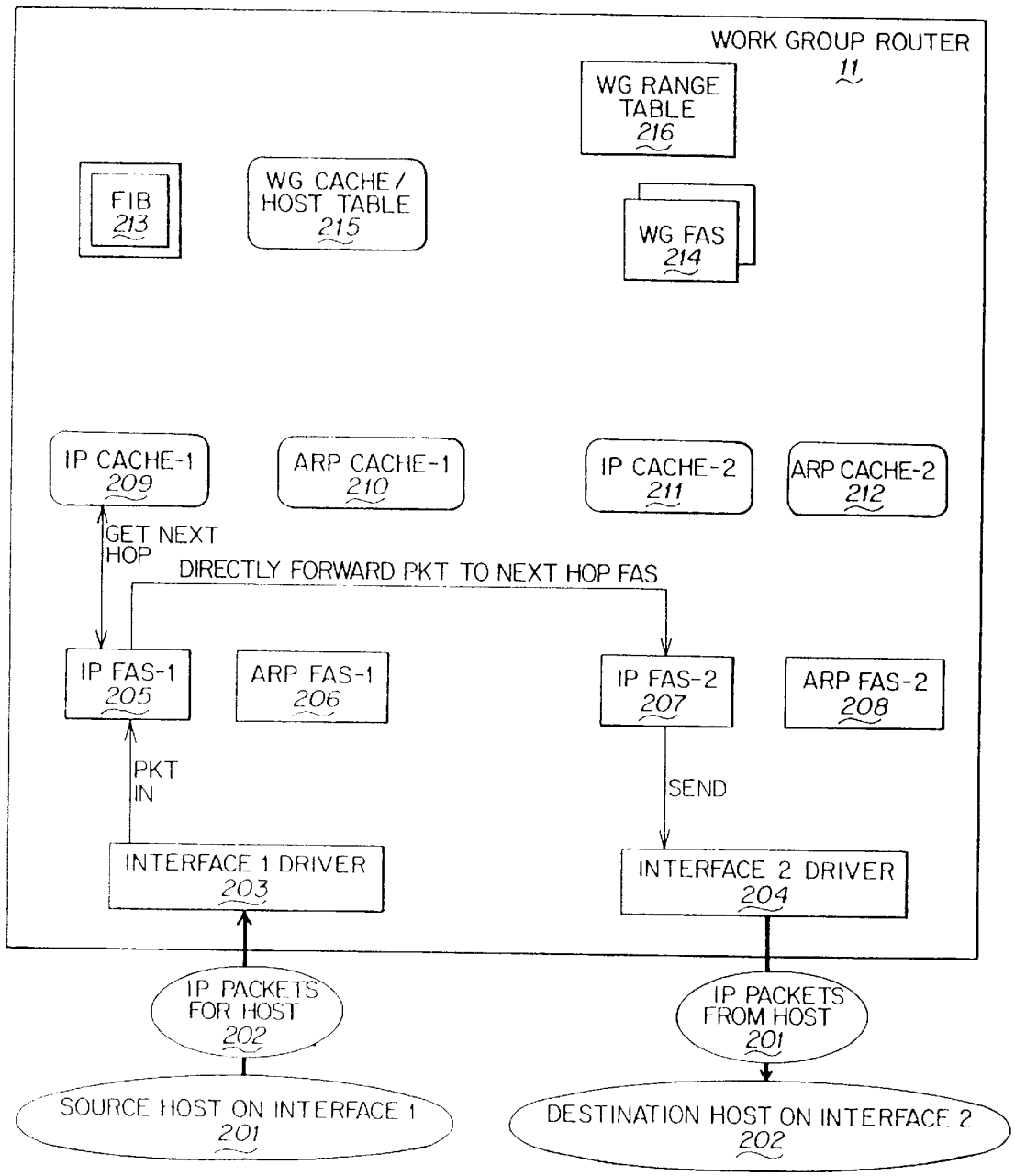

Reference FIG. 8e:

Source host 201 continues to send IP packets to destination host 202. Because of the entry in IP Cache-1 209, these packets are directly forwarded to IP FAS-2 207.

Figure 8F:
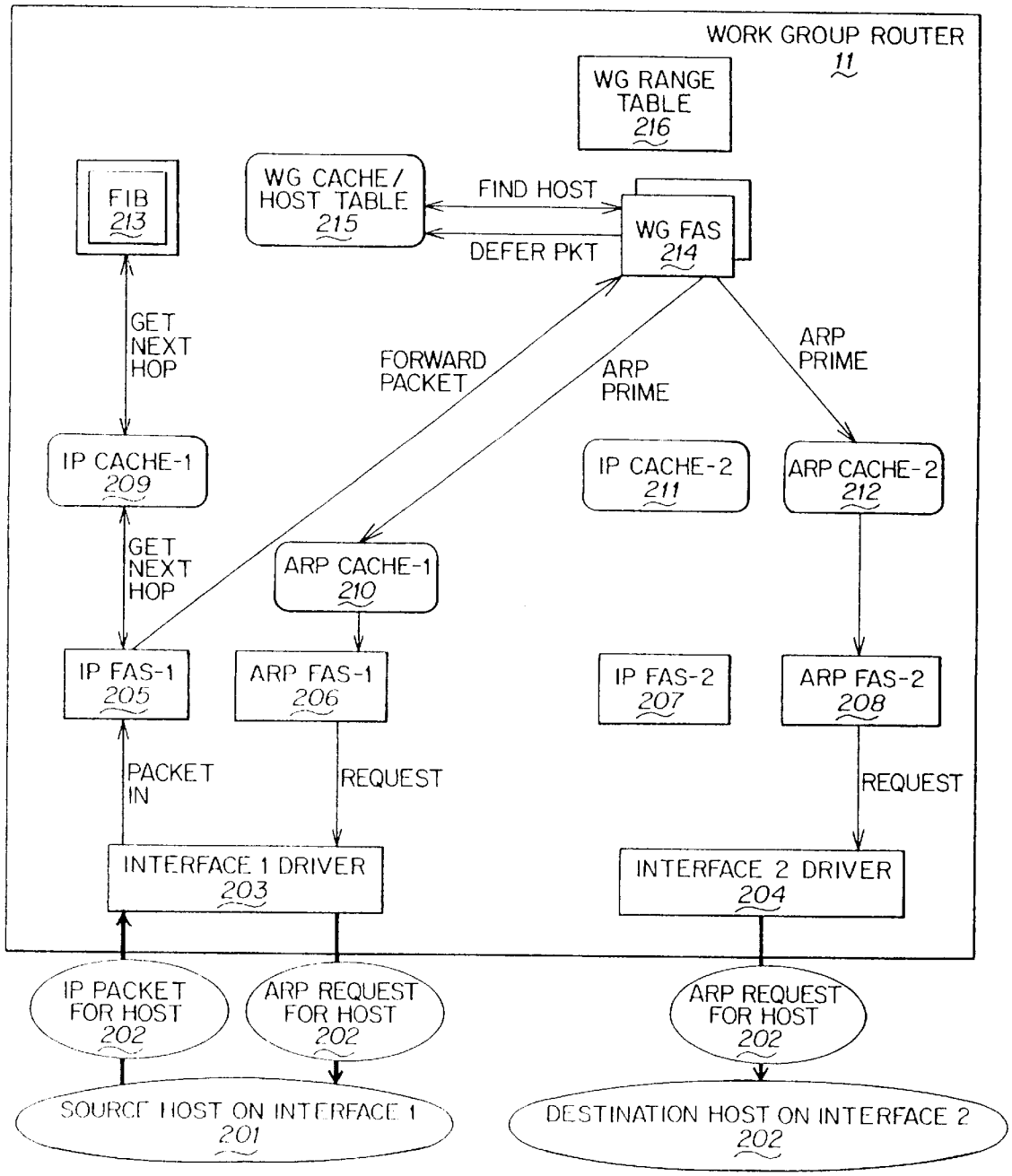

Reference FIG. 8f:

Eventually the entry in the IP Cache-1 209 ages out. Now these packets force IP FAS-1 205 to consult the FIB 213 and forward them instead to the WG FAS 214. The WG FAS tries to find the host in the WG Cache 215. In the case of the WG Cache entry having aged out, the packets are deferred in the WG Cache while the WG FAS again floods out ARP requests on all interfaces in the workgroup. (FIG. 8d previously described the case of the entry still being in the WG Cache.)

Figure 8G:
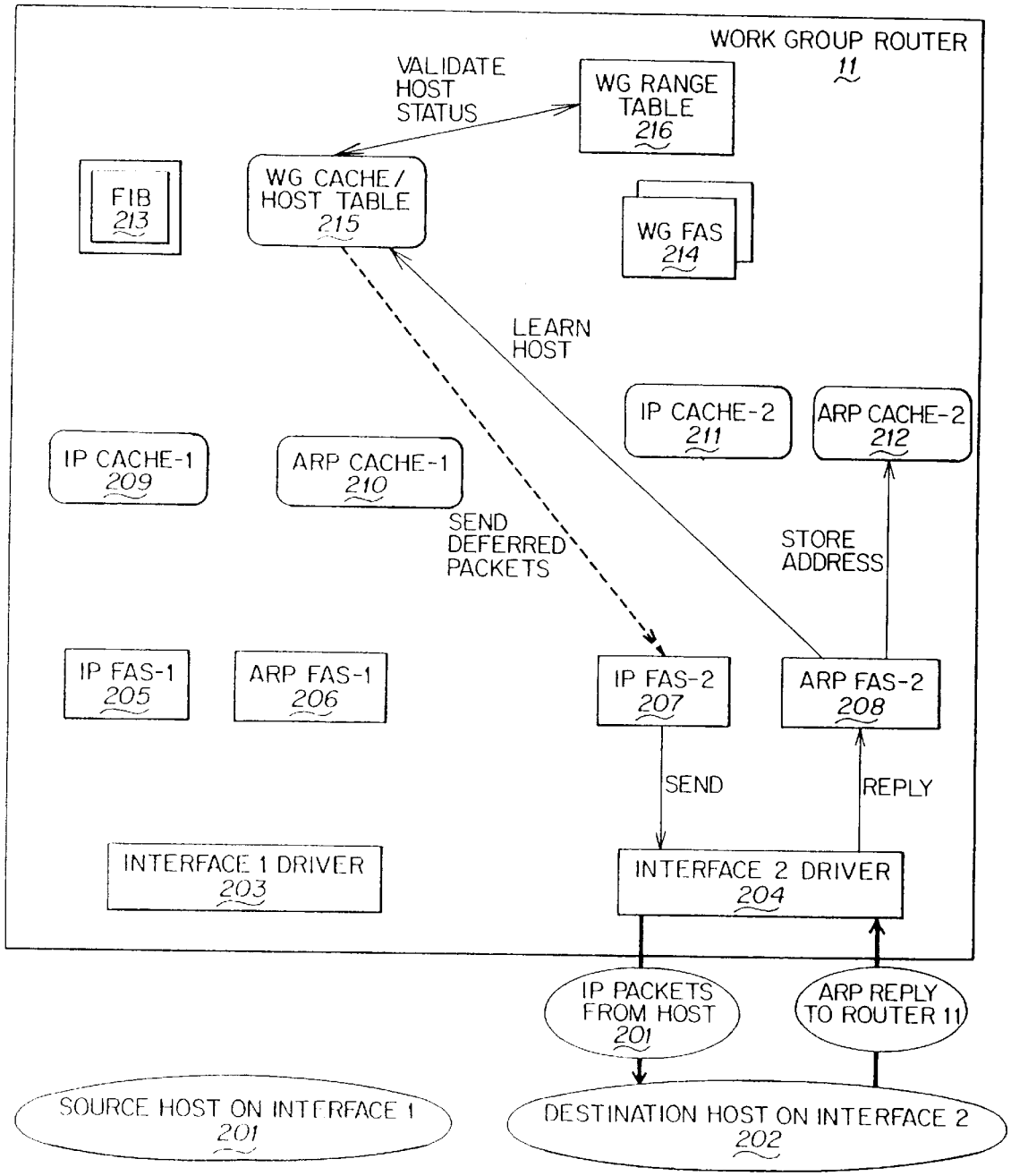

Reference FIG. 8g:

An ARP Reply is finally received from host 202 and the WG Cache entry is relearned, the WG Cache 215 validates the host status with the Range Table 216, and since the host 202 is valid on interface 2, the WG Cache 215 forwards the deferred packets through IP FAS-2 207.

Pseudo code of several routines for implementing this embodiment is set forth below:

SERVICE routine of receiving interface FAS if (Work Group FAS and FASTPATH):
      skip IP header validation; else:
         check version, length, check sum and time to live IP
            header fields;
         check for martian addresses;
   do Access List Control filter check;
   lookup next hop in FAS cache;

--- returns next IP address and next FAS
   FAS cache is loaded from FIB upon cache miss
   call FORWARD routine of next FAS
   this could be in Work Group FAS or an Interface FAS.

FORWARD routine of Work Group FAS
  call find host to lookup in Work Group Cache of Host Table;
    if (INVALID):
      consume IP packet;
    if (VALID):
      update FAS cache on receiving interface for next hop Interface FAS;
      call FORWARD routine of next hop Interface FAS;
      if (UNKNOWN):

--- packet was deferred in host cache
flood ARP requests out all interfaces in this Work Group

---

FORWARD routine of forwarding Interface FAS
  do Access List Control filter check;
  call ARPRESOLVE to map IP to physical address, pass in packet;
  if (NOT DEFERRED):
    send out IP packet done.

---

-- for Work Group, proxy ARP and snooping enabled;
-- for non Work Group, proxy and snooping are MIB settable.

---

SERVICE routine of receiving interface ARP FAS
  if (snooping or
    packet is addressed to one of the router's IP addresses
    or
    proxy is enabled and the PROXY TEST returns OK):
    call ARPSET routine to cache source host from packet;
  if (REQUEST packet addressed to Router or proxy OK):
    send arp REPLY to source address in packet done.
PROXY TEST routine of interface ARP Agent
  if (not Work Group interface):
    if (FIB has a route with next hop not on subnet of receiving interface):
      return proxy OK;
    else: return proxy NOTOK;
  if (Work Group interface):
    call FIND HOST in Work Group Cache;
    if (INVALID or host found on receiving interface):
      return proxy NOTOK;
    if (VALID on different interface)
      return proxy OK.
  if (UNKNOWN) call ARPPRIME on every interface in this work group and return proxy NOTOK
ARPSET routine in interface ARP Cache:
  lookup entry in arp cache with packet's source IP;
  cache the new physical address from source field in received packet;
  if (arp entry was WAITING):
    send out deferred IP packets;
    if (Work Group Interface):
      call LEARN HOST, pass configuration;
      will cache source host from the ARP packet return
ARPPRIME routine in interface ARP Cache:
  lookup entry in arp cache with packet's source IP;
  if (not found): set as new entry;
  if (not already on retry queue):
    put on retry queue;
  will retry ARP REQUESTs
    broadcast out arp REQUEST on interface;
  set arp entry status WAITING return
ARPRESOLVE routine in interface ARP Cache:
  ARP cache is loaded by ARP protocol or static management via MIBII Net-to-Media Table.
  lookup host IP address in arp cache;
  if (not found):
    set as new entry with status WAITING;
  if (WAITING):
    defer packet on arp entry packet queue;
    if (not already on retry queue):
      put on retry queue;
      broadcast out arp REQUEST on interface;
    return DEFERRED;
  if (RESOLVED):
    return OK, and physical address.
FIND HOST routine of Work Group Cache:

---

Configuration = interface and physical address.
Host entries in cache having Range Status field with values:

---

VALID—host matches configuration in Range Table or not in Range Table but not High Security Work Group.
  INVALID—host violates configuration in Range Table or not in Range Table and High Security Work Group.
  NOT SET—host configuration not yet resolved by arp or host aged out on age queue.
    lookup host entry in Work Group Cache of Host Table;
    if (not found):
      set new entry for host IP address in cache;
      set entry's Range Status to NOT SET;
    check host entry's Range Status;
    if (INVALID):
      tell source (via ICMP) that packet was administratively filtered;
      return INVALID;
    if (VALID):
      return VALID and host interface FAS;
    if (NOT SET):
      defer IP packet on packet queue of host entry;
      return UNKNOWN.
LEARN HOST routine, in Work Group Cache:
  Configuration, interface and physical address, is passed in lookup host entry in Work Group Cache of Host Table.
  if (not in cache):
    create new entry;
  if (packet configuration not equal to host entry configuration):
    set new configuration in entry;
    call VALIDATE HOST in Range Table to get Range Status;
    if (VALID): send deferred packets to source address;
    if (INVALID): flush deferred packets;
  set host entry status to Range Status from Range Table;
  set host entry age queue status to YOUNG.

```
-- Cache entried age with a keepalive attempt,
-- age out in less than 10 minutes if not active)
return
```

VALIDATE HOST routine in Range Table:
  lookup host in Range Table;
  if (host not in Range Table):
    return INVALID if High Security Work Group, else
      return VALID;
  if (host found in Range Table):
    compare range entry configuration to packet configuration;
    if (configuration matches): return VALID;
    else return INVALID.

Figure 9:
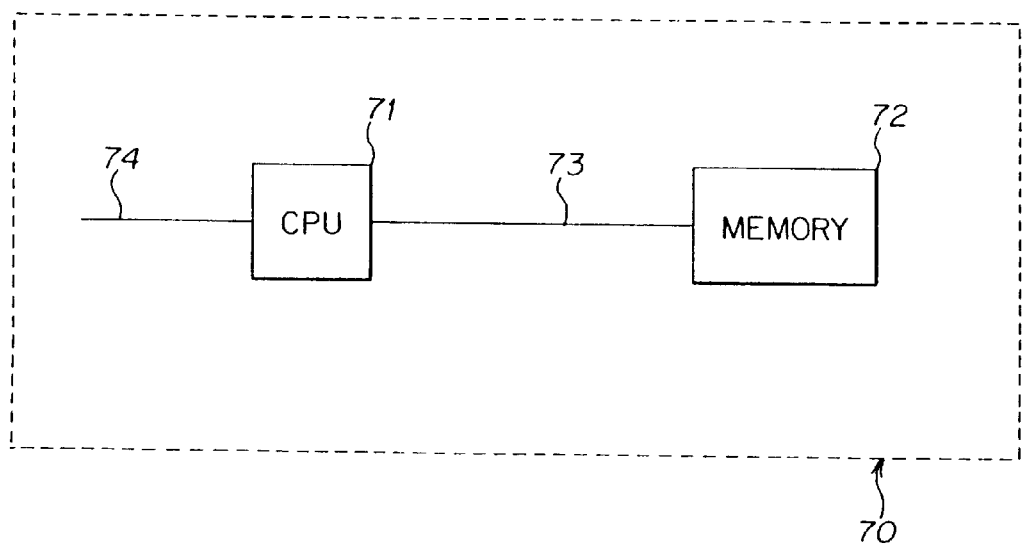
FIG. 9 shows a general purpose computer and memory for implementing the invention.

The above embodiments may be implemented in a general purpose computer 70 as shown in FIG. 9. This general purpose computer may include a Computer Processing Unit (CPU) 71, memory 72, a processing bus 73 by which the CPU can access the memory, and interface 74 to the rest of the router. Alternatively, the invention may be a memory 72, such as a floppy disk, compact disk, or hard drive, that contains a computer program or data structure, for providing to a general purpose computer instructions and data for carrying out the functions of the previous embodiments.

Having thus described a particular embodiment of the invention, various modifications will readily occur to those skilled in the art which are intended to be within the scope of this invention. Accordingly, the foregoing description is by way of example only, and not intended to be limiting.

What is claimed is:

1. A method of forwarding IP packets in a network device between a plurality of host based on IP addressing, wherein the network device has a plurality of network interfaces connecting a pluralty of host networks and the at least one host is coupled to at least one of the plurality of network interfaces, comprising:
  assigning the plurality of network interfaces to an IP work group, each of the plurality of network interfaces of the IP work group having a single IP work group address and wherein the at least one host has an IP address assigned in the IP work group; and
  the network device forwarding IP packets received from the host between the plurality of network interfaces if the at least one host is permitted to transmit packets to the at least one network interface to which the at least one host is coupled.

2. The method of claim 1, including assigning one or more of the plurality of network interfaces in the IP work group to a designated range of host IP addresses, and wherein forwarding of IP packets is restricted to hosts complying with the designated range.

3. The method of claim 2, wherein select network interfaces are assigned to the same host IP address range.

4. The method of claim 2, wherein select network interfaces are assigned to different host IP address ranges.

5. The method of claim 1, including assigning one or more of the plurality of the network interfaces in the IP work group to a designated level of security, and wherein forwarding of IP packets is restricted to compliance with the designated level of security.

6. The method of claim 5, wherein one security level identifies hosts as "free" in order to permit forwarding to/from any network interface in the IP work group, and another security level identifies hosts as "secured" in order to permit forwarding to/from one or more designated network interfaces in IP work group.

7. The method of claim 5, wherein the secured level includes a "low" security work group wherein a host with any physical address is free to reside on any network interface as long as its IP address not lie within a specified host address range, but if it does fall in the specified range then it must reside on a designated network interface for that range.

8. The method of claim 5, wherein the secured level includes a "medium" security work group wherein a host's IP address must fall within a specified host address range for a designated network interface, but unless a physical address is also specified, the physical address is not constrained.

9. The method of claim 5, wherein the secured level includes a "high" security work group when a host must have a specified host IP address for a designated network interface and have a designated physical address.

10. The method of claim 1, including assigning one or more of the plurality of network interfaces in the IP work group a designated range of host physical address(es), and wherein forwarding of IP packets is restricted to hosts complying with the designated range.

11. The method of claim 2, including assigning one or more of the plurality of network interface in the IP work group a designated range of host physical address(es), and wherein forwarding of IP packets is restricted to hosts complying with the designated range.

12. The method of claim 10, wherein the designated range is for a single physical address.

13. The method of claim 1, wherein if an IP packet contains source and destination host addresses within the same IP work group, forwarding of the IP packet occurs without performing header and address validation.

14. The method of claim 1, further including configuring a forwarding information base (FIB) with a route for the IP work group.

15. The method of claim 1, including maintaining a host table of IP host addresses and their associated interfaces.

16. The method of claim 15, further comprising reviewing the host table for duplicate IP host addresses and associated interfaces.

17. The method of claim 1, further comprising maintaining a count of host network interfaces within the IP work group.

18. The method of claim 15, further comprising monitoring the hosts heard on each network interface and maintaining the host table of IP host addresses and the associated network interfaces on which each host is heard.

19. The method of claim 15, wherein the host table is maintained as a cache memory accessible by each of the network interfaces.

20. The method of claim 2, further comprising:
  providing a work group forwarding agent for each IP work group.

21. The method of claim 20, further comprising:
  maintaining a host table of IP host addresses and their associated network interfaces; and
  wherein the work group forwarding agent, prior to forwarding an IP packet, accesses the host table for the associated network interface.

22. The method of claim 21, wherein:
  the work group forwarding agent sends ARP requests to all network interfaces in the IP work group to resolve an unknown host physical address.

23. The method of claim 22, further comprising:
  providing an ARP forwarding agent at each network interface in the work group, for accessing the host table.

24. The method of claim 2, further comprising:
maintaining a range table of host IP addresses and associated network interfaces on which the hosts may reside; and
prior to forwarding an IP packet, accessing the range table to validate at least one of a source host and a destination host.

25. The method of claim 1, wherein a host is attachable to any network interface in the IP work group without requiring reconfiguration of the host IP address.

26. The method of claim 25, including assigning one or more of the plurality of network interfaces in the IP work group to a designated range of host IP addresses, and wherein forwarding of IP packets is restricted to hosts complying with the designated range.

27. The method of claim 25, including assigning one or more of the plurality of network interfaces in the IP work group to a designated level of security, and
wherein forwarding of IP packets is restricted to compliance with the designated level of security.

28. The method of claim 25, including assigning one or more of the plurality of network interfaces in the IP work group to a designated range of host physical address(es), and
wherein forwarding of IP packets is restricted to hosts complying with the designated range.

29. A network device for forwarding IP packets between a plurality of hosts based on IP addressing wherein the network device has a plurality of network interfaces connecting a plurality of host networks and, the improvement comprising:
means for assigning the plurality of network interfaces to an IP work group, each of the plurality of network interfaces of the IP work group having a single IP work group address and wherein the at least one host has an IP address assigned in the IP work group; and
means for forwarding IP packets received from the host between the plurality of network interfaces if the at least one host is permitted to transmit packets to the at least one network interface to which the at least one host is coupled.

30. The network device of claim 29, wherein the assigning means assigns one or more of the plurality of the network interfaces in the IP work group to a designated range of host IP addresses, and wherein forwarding of IP packets by the forwarding means is restricted to hosts complying with the designated range.

31. The network device of claim 30, wherein the assigning means assigns select network interfaces to the same host IP address range.

32. The network device of claim 30, wherein the assigning means assigns select network interfaces to different host IP address ranges.

33. The network device of claim 29, wherein the assigning means assigns one or more of the plurality of network interfaces in the IP work group to a designated level of security, and wherein forwarding of IP packets by the forwarding means is restricted to compliance with the designated level of security.

34. The network device of claim 29, wherein the assigning means assigns one or more of the plurality of host network interfaces in the IP work group a designated range of host physical address(es), and wherein forwarding of IP packets by the forwarding means is restricted to hosts complying with the designated range.

35. The network device of claim 30, wherein the assigning means assigns one or more of the plurality of network interfaces in the IP workgroup a designated range of host physical address(es), and
wherein forwarding of IP packets by the forwarding means is restricted to hosts complying with the designated range.

* * * * *